US010647585B2

(12) United States Patent
Valtchev et al.

(10) Patent No.: US 10,647,585 B2
(45) Date of Patent: May 12, 2020

(54) METHOD FOR THE PREPARATION OF SYNTHETIC CRYSTALLINE ZEOLITE MATERIALS WITH ENHANCED PORE VOLUME

(71) Applicant: CENTRE NATIONAL DE LA RECHERCHE SCIENTIFIQUE, Paris (FR)

(72) Inventors: Valentin Valtchev, Basly (FR); Jean-Pierre Gilson, Cairon (FR); Zhengxing Qin, Herouville Saint Clair (FR)

(73) Assignee: CENTRE NATIONAL DE LA RECHERCHE SCIENTIFIQUE, Paris (FR)

( * ) Notice: Subject to any disclaimer, the term of this patent is extended or adjusted under 35 U.S.C. 154(b) by 0 days.

(21) Appl. No.: 15/323,112

(22) PCT Filed: Jul. 8, 2015

(86) PCT No.: PCT/EP2015/065641
§ 371 (c)(1),
(2) Date: Dec. 30, 2016

(87) PCT Pub. No.: WO2016/005472
PCT Pub. Date: Jan. 14, 2016

(65) Prior Publication Data
US 2018/0194635 A1 Jul. 12, 2018

(30) Foreign Application Priority Data

Jul. 9, 2014 (WO) .................. PCT/IB2014/001490

(51) Int. Cl.
*B01J 29/06* (2006.01)
*C01B 39/02* (2006.01)
*B01J 29/04* (2006.01)
*B01J 29/70* (2006.01)
*C01B 39/32* (2006.01)
*B01J 29/60* (2006.01)
*B01J 35/10* (2006.01)
*B01J 20/18* (2006.01)
*B01J 20/30* (2006.01)
*B01J 29/08* (2006.01)
*B01J 29/18* (2006.01)
*B01J 29/40* (2006.01)
*B01J 37/06* (2006.01)
*B01J 37/30* (2006.01)
*C01B 39/24* (2006.01)
*C01B 39/26* (2006.01)
*C01B 39/38* (2006.01)
*C01B 39/46* (2006.01)

(52) U.S. Cl.
CPC ............ *C01B 39/026* (2013.01); *B01J 20/186* (2013.01); *B01J 20/3071* (2013.01); *B01J 20/3085* (2013.01); *B01J 29/041* (2013.01); *B01J 29/084* (2013.01); *B01J 29/18* (2013.01); *B01J 29/40* (2013.01); *B01J 29/60* (2013.01); *B01J 29/70* (2013.01); *B01J 29/7007* (2013.01); *B01J 35/109* (2013.01); *B01J 35/1057* (2013.01); *B01J 35/1061* (2013.01); *B01J 37/06* (2013.01); *B01J 37/30* (2013.01); *C01B 39/24* (2013.01); *C01B 39/26* (2013.01); *C01B 39/32* (2013.01); *C01B 39/38* (2013.01); *C01B 39/46* (2013.01); *B01J 2229/126* (2013.01); *B01J 2229/186* (2013.01); *B01J 2229/38* (2013.01)

(58) Field of Classification Search
CPC ........ B01J 29/041; B01J 29/084; B01J 29/18; B01J 29/40; B01J 29/60; B01J 29/7007; B01J 2229/38; B01J 2229/186; B01J 35/1057; B01J 35/1061; B01J 35/109; B01J 37/06; B01J 37/30; B01J 2229/2229; C01B 39/026; C01B 39/26; C01B 39/46; C01B 39/24; C01B 39/38; C01B 29/32; C01B 39/32
USPC ..... 502/60, 77, 78, 79, 85, 86; 423/700, 716
See application file for complete search history.

(56) References Cited

U.S. PATENT DOCUMENTS

| 5,100,644 A | 3/1992 | Skeels et al. |
| 7,589,041 B2 * | 9/2009 | Ying .................. B01J 20/18 502/63 |
| 2008/0014140 A1 | 1/2008 | Christensen et al. |
| 2010/0196263 A1 * | 8/2010 | Garcia-Martinez ......... C01B 39/026 423/713 |
| 2012/0027673 A1 | 2/2012 | Larsen et al. |
| 2013/0085311 A1 | 4/2013 | Youn et al. |
| 2013/0090233 A1 * | 4/2013 | Simon ................. B01J 29/084 502/74 |

FOREIGN PATENT DOCUMENTS

CA 1288086 8/1991

OTHER PUBLICATIONS

Search Report dated Nov. 9, 2015.
Characterization of Fluorinated H Zeolite with NH4F dated Nov. 11, 2010.
(Continued)

*Primary Examiner* — Elizabeth D Wood
(74) *Attorney, Agent, or Firm* — IPSilon USA, LLP

(57) ABSTRACT

The present invention relates to a method for the preparation of a synthetic crystalline zeolite material, to said synthetic crystalline zeolite material, and to the uses of said method and said synthetic crystalline zeolite material in various applications.

9 Claims, 8 Drawing Sheets

(56) References Cited

OTHER PUBLICATIONS

Chemical Equilibrium Controlled Etching of MFI-Type Zeolite and Its Influence on Zeolite Structure, Acidity, and Catalytic Activity dated Jun. 21, 2013.
Enhanced performance of methane dehydro-aromatization on Mo-based HZSM-5 zeolite pretreated by NH4F dated Jan. 18, 2007.
ZSM-5 zeolite with enhanced acidic properties dated Sep. 6, 1999.

* cited by examiner

METHOD FOR THE PREPARATION OF SYNTHETIC CRYSTALLINE ZEOLITE MATERIALS WITH ENHANCED PORE VOLUME

RELATED APPLICATIONS

This application is a National Phase Application of PCT/EP2015/065641 filed on Jul. 8, 2015, which in turn claims the benefit of priority from PCT/IB2014/001490 filed on Jul. 9, 2014, the entirety of which are incorporated herein by reference.

BACKGROUND

Field of the Invention

The present invention relates to a method for the preparation of a synthetic crystalline zeolite material, to said synthetic crystalline zeolite material, and to the uses of said method and said synthetic crystalline zeolite material in various applications.

Description of Related Art

Zeolites are hydrated metal aluminum silicates basically comprising a three-dimensional framework of $SiO_4$ and $AlO_4$ tetrahedra. The electroneutrality of each tetrahedra containing aluminum is balanced by the inclusion in the crystal of a cation, for example a sodium ion. The micropore spaces (channels and cavities) are occupied by water molecules prior to dehydration. Zeolites are characterized by their high specific surface areas, high micropore volume (i.e. pores with a size of below 2 nm), and capacity to undergo cation exchange. Zeolites as microporous inorganic materials have different applications, such as catalysts (e.g. use in heterogeneous catalysis), absorbents, ion-exchangers, and membranes in many chemical and petrochemical processes (e.g. in oil refining, fine- and petro-chemistry) due to their superior properties including mechanical strength, acidity, size or shape selectivity, thermal and chemical stability, and large ion-exchange capacity. The number of established framework or structure types has increased progressively in the last 4 to 5 decades of highly active research in the field of zeolites. Currently, the number of established structure types is clearly in excess of 210. All zeolite structure types are referenced with three capital letter codes. They have different framework densities, chemical compositions, dimensional channel systems and thus, different properties. Examples of frequently encountered framework type zeolites are FAU-type zeolites which can be subdivided into FAU-X zeolite (Si/Al molar ratio=1-1.5) and FAU-Y zeolite (Si/Al molar ratio>1.5); MOR-type zeolites; LTL-type zeolites; and MFI-type zeolites which includes ZSM-5 zeolites. While the chemical composition, the framework density, and the type (one, two, or three dimensional) and size of the channel system of zeolites are important, a precise control of their porous network (i.e. pore architecture) can dramatically influence their properties for example, in catalysis and adsorption. For example, in catalysis and adsorption, one of the drawbacks of zeolites is the occurrence of restricted diffusion due to their microporous network and pore blocking by coke formation, impeding the full use of their potential. Indeed, zeolite materials such as FAU-Y-type and ZSM-5-type zeolites have very small micropores (i.e. micropores having a size of less than 1.5 nm).

In order to circumvent the inherent diffusion limitations of microporous zeolite-type materials, it is known to introduce a secondary porosity consisting of larger pores, i.e. macropores and/or mesopores through the removal of a fraction of framework atoms.

As an example, van Donk et al. [*Catal. Rev. Sci. Eng.*, 2003, 45, 297-319] described the production of mesoporosity in a zeolite material by a dealumination method including steaming and acid leaching. However, the production of mesoporosity strongly depends on the chemical composition of the starting zeolite material since both mesopores size and volume decrease with the aluminum content. Thus, this method only applies to starting zeolite materials displaying a low Si/Al molar ratio of between 2.5 and 5. In addition, the obtained mesopores are irregular and are not homogeneously distributed within the zeolite material. Furthermore, since this method tends to selectively remove the aluminum framework, it changes the distribution of silicon and aluminum of the starting zeolite material and therefore, its acidic properties. Thus, an irreconcilable conflict exists between mesopores formation and acidity preservation, since the mesopores forms at the expense of framework aluminum.

Another approach described by Perez-Ramirez et al. [*Chem. Soc. Rev.*, 2008, 37, 2530-2542] to create mesoporosity is alkaline treatment, which tends to selectively remove the silicon framework and does not suffer as much from the above-mentioned dilemma between mesopore formation and acidity preservation. This approach has been widely used in recent years for the preparation of various mesoporous zeolite materials. However, low silica initial zeolite materials are excluded because starting from an initial zeolite material having a high aluminum content leads to restricted silicon extraction, and thus minor mesopores formation. Thus, this approach is more applicable to zeolite materials displaying a high Si/Al molar ratio of between 30 and 50. In addition, like the dealumination method, the desilication approach changes substantially the chemical composition of the starting zeolite (i.e. its Si/Al initial molar ratio) and therefore, its acidic properties. Both methods, dealumination and desilication, are cation-selective approaches and are characterized by a surface reaction rather than a volume reaction. Thus, the volume of the starting zeolite material remains almost intact.

Other methods consist of using a sacrificial porogen such as carbon black, to produce mesoporosity in a zeolite material [*J. Am. Chem. Soc.*, 2000, 122, 7116-7117]. Then, the sacrificial porogen is eliminated after the synthesis by high temperature combustion (e.g. calcination). However, sacrificial porogens are generally not environmentally friendly (e.g. water and air pollution arising from their thermal decomposition), non-recyclable and expensive. Moreover, the high temperature combustion can lead to an irreversible aggregation of the nanocrystals of the zeolite material into larger solid particles, thus diminishing their expected advantages. Moreover, very small crystalline yields are obtained (i.e. yield of about 10%). In addition, partial distortion (collapse) of the crystalline structure of zeolite materials under calcination is observed. Finally, these methods can't be applied on a large scale.

Qin et al. [*Chem. Mater.*, 2013, 25, 2759-2766] have recently described a process for preparing MFI-type zeolite materials (e.g. ZSM-5 zeolites) displaying a secondary porosity consisting of macropores and/or large mesopores, by using buffering aqueous hydrofluoric acid (HF) solutions with ammonium fluoride ($NH_4F$) (i.e. HF—$NH_4F$ solutions). However, the use of HF—$NH_4F$ solutions does not lead to a substantial increase in the total pore volume since the micropore volume and the secondary pore volume (mesopore volume and/or macropore volume) remain almost constant, thus leading to zeolite materials with catalytic performances which are not optimized. Moreover, the kinetics of the HF—NH$_4$F is very fast, which makes a precise control of the treatment almost impossible. In addition, aqueous HF solution is a contact-poison involving tissue death, thus preventing its use on a large scale without providing expensive equipment and downstream processing of the effluents.

By contrast, the use of low concentrated aqueous or non-aqueous NH$_4$F solutions (e.g. solutions having a NH$_4$F mass concentration lower than 5-10%) or the use of low amounts of NH$_4$F with respect to the mass of starting zeolite material (e.g. use of less than 0.5 g of NH$_4$F for 1 g of starting zeolite material) for the fluorination of zeolite materials has been extensively described. As an example, Le Van Mao et al. [*Appl. Cat. A*: General, 1999, 185, 41-52] described a process comprising: a step of fluorination of a zeolite material (H-ZSM-5) by impregnating said zeolite material with an aqueous solution of NH$_4$F, and a step of calcination of the resulting solid phase at elevated temperatures (e.g. 300 to 500° C.). This process leads to the replacement of the oxygen atoms at the surface of the zeolite material with F atoms (formation of surface Si—F groups instead of surface Si—OH groups), thus tuning the acidic properties of the starting zeolite material and its hydrophobic properties. Although the resulting zeolite material shows higher catalytic activity, this process requires a high temperature activation step (i.e. calcination step) after the fluorination step. Such a calcination step can lead to the decomposition of NH$_4$F and the following attack of the zeolite material crystalline structure by the chemisorbed H$^+$F$^-$ ion pairs. In addition, it is clearly shown that when the initial NH$_4$F loading is low, there is no significant change in zeolite framework, whereas by increasing it, a significant loss of micropore volume is observed which is due to the amorphisation of zeolite framework.

OBJECTS AND SUMMARY

Consequently, an alternative method of synthesis that provides a synthetic crystalline zeolite material with increased total pore volume but without the above disadvantages is highly desirable, in particular for applications such as adsorption and heterogeneous phase catalysis.

More particularly, the aim of the present invention is to provide a preparation method which either increases the micropore volume or introduces a secondary porosity comprising mesopores while maintaining or increasing the starting (i.e. initial) micropore volume, thus expanding the channels/cavities dimensions in any framework type of crystalline zeolite material, without any substantial change in its chemical composition (e.g. Si/Al molar ratio), its surface chemical composition, its acidic properties, and its hydrophilic/hydrophobic properties.

A first object of the present invention is a method for the preparation of a synthetic crystalline zeolite material comprising micropores and eventually mesopores, said synthetic crystalline zeolite material having a silicon to aluminum molar ratio Si/Al≥1 and, wherein said method comprises at least the following steps:

1) a step of contacting a NH$_4$F solution with a starting crystalline zeolite material at a temperature ranging from about 0° C. to about 100° C., said NH$_4$F solution having a NH$_4$F mass concentration of at least about 15 wt % and said starting crystalline zeolite material being essentially microporous and having a silicon to aluminum molar ratio Si/Al≥1;

2) a washing step;

3) a drying step at a temperature ranging from about 25° C. to about 120° C., for about 1 h to about 24 h, to recover said synthetic crystalline zeolite material.

The method of the present invention is neither Si nor Al selective, and thus etches the zeolite material without altering its framework composition. In addition, said method is very simple and safe, does not require any specific equipment and leads to synthetic crystalline zeolite materials having improved diffusion and/or controlled acidity, and therefore, better overall catalytic performances. In addition, the method does not consume much energy in contrast to high temperature steaming processes presently used in the industry (i.e. steaming with 100% H$_2$O vapors at a temperature of 700-850° C. to obtain the zeolite Y commercialized under the brand name "Ultra Stable Zeolite Y" or USY), and generates less toxic waste.

Thanks to the use of concentrated NH$_4$F aqueous or non-aqueous solutions as a mild etchant, the chemical etching of the zeolite material framework is performed while increasing its total pore volume by either increasing its micropore volume without generating an additional mesoporosity, or creating uniform mesoporosity while maintaining or increasing its microporosity and thus, creating a uniform connection between the native micropores and the newly created mesopores. Thus, the method improves access to the micropore volume of the starting crystalline zeolite material.

Indeed, contrary to the previously described HF—NH$_4$F solution which only dissolves the defect parts of the zeolite material, the NH$_4$F solution used in the method of the present invention slowly and uniformly attacks the entire structure of the zeolite material leading to the increase of the pore volume. The dissolution process does not start from the surface of the zeolite material but is based on the saturation of the zeolite micropores with the concentrated NH$_4$F solution that regularly dissolves spaced zeolite material walls in the volume of the crystals, thus first expanding the micropore volume, and then creating small mesocavities or mesopores. The process can be controlled by a number of parameters including NH$_4$F concentration, zeolite/NH$_4$F ratio, time and temperature of treatment.

Zeolite materials obtained by the method of the present invention combine the intrinsic zeolite materials characteristics with mesopore size cavities distributed uniformly in said zeolite materials, leading to substantial improvement of their current commercial applications (e.g. fluid catalytic cracking (FCC), hydrocracking, catalytic dewaxing, olefins processing, aromatics production and processing, etc. . . . ). In addition, they can be prepared on a large scale.

Depending on the type of starting crystalline zeolite material and the reaction conditions, the method of the present invention increases the micropore volume (i.e. the size and/or the number of the micropores increases), or adds a mesoporous network to the starting crystalline zeolite material while maintaining or increasing the micropore volume. Thus, the total pore volume is increased through the non-selective removal of a fraction of framework atoms.

Within the meaning of the present invention and unless noted otherwise, the term "micropores" is understood to mean pores having a mean dimension of less than 2 nm.

Within the meaning of the present invention and unless noted otherwise, the term "mesopores" is understood to mean pores having a mean dimension of about 2 to about 50 nm.

Within the meaning of the present invention and unless noted otherwise, the term "micropores" is understood to mean pores having a mean dimension of more than 50 nm.

Within the meaning of the present invention, the term "a zeolite material essentially microporous" is understood to mean a zeolite material in which the micropore volume represents more than about 70%, preferably more than about 80%, and more preferably more than about 90% of the total pore volume.

Within the meaning of the present invention and unless noted otherwise, the term "crystalline starting zeolite material" is understood to mean a starting zeolite material having a powder X-ray diffraction pattern approved by the Structure Commission of the International Zeolite Association (IZA-SC)(http://www.iza-structure.org/databases/).

Within the meaning of the present invention and unless noted otherwise, the term "crystalline synthetic zeolite material" is understood to mean a synthetic zeolite material having a powder X-ray diffraction pattern similar to the starting zeolite material used in the method of the invention. In other words, the level of crystallinity does not change more than 50%, preferably does not change more than 30%, and more preferably does not change more than 10%, by measuring the total areas under all the peaks in the XRD diffraction pattern.

According to the method of the invention, step 1) aims at contacting a starting crystalline zeolite material with an $NH_4F$ solution having a $NH_4F$ mass concentration of at least about 15 wt %. Thus, the starting crystalline zeolite material used in step 1) is a dry starting crystalline zeolite material. In other words, step 1) is carried out on a dry starting crystalline zeolite material. The starting crystalline zeolite material is not mixed with an aqueous or organic solvent to form a suspension or a solution of said starting crystalline zeolite material before the contacting step 1). The starting crystalline zeolite material used in step 1) is in the form of a dry compound. The starting crystalline zeolite material of step 1) is therefore not used in the form of a suspension or a solution.

A $NH_4F$ mass concentration of at least about 15 wt % corresponds to a $NH_4F$ molar concentration of at least about 4.0 mol/l.

It is noted that since the starting crystalline zeolite material is used as a dry compound in step 1), the contacting step 1) leads to a resulting mixture composed of the starting crystalline zeolite material impregnated by the $NH_4F$ solution or immersed in the $NH_4F$ solution.

The $NH_4F$ solution is preferably a $NH_4F$ aqueous solution.

The $NH_4F$ mass concentration in the solution is at least about 15 wt % at the beginning of step 1) and progressively decreases with time due to the reaction between $NH_4F$ and the starting crystalline zeolite material.

In a preferred embodiment, the starting crystalline zeolite material of step 1) does not comprise mesopores.

Said starting crystalline zeolite material has preferably a mesopore volume of less than about 0.08 $cm^3/g$, and more preferably of less than about 0.04 $cm^3/g$.

The starting crystalline zeolite material of step 1) can have a Si/Al equal or greater than about 1.0, preferably equal or greater than about 1.6, more preferably of between about 1.6 and about 1000, and more preferably of between about 1.6 and about 100.

The starting crystalline zeolite material of step 1) can further comprise monovalent or divalent cations M, preferably selected from $Na^+$, $K^+$, $Mg^{2+}$, $Ca^{2+}$, $NH_4^+$ and $H^+$. The cations M compensate the negative charges of the starting crystalline zeolite material framework.

$NH_4^+$ and $H^+$ cations are preferred since they are inert with regards to the $NH_4F$ species during the contacting step 1).

The starting crystalline zeolite material of step 1) can be chosen from FAU-type zeolite materials (FAU-Y), MFI-type zeolite materials (ZSM-5 or silicate-1), MOR-type zeolite materials, LTL-type zeolite materials, and any other type of zeolite materials which contains silicon and aluminum in its framework such as Beta zeolite materials.

FAU-Y, ZSM-5, MOR-type, LTL-type, and Beta zeolite materials are preferred.

FAU-Y, LTL-type and MOR-type zeolite materials are more preferred.

Step 1) can be performed in a closed or open vessel. Open vessel is preferred so as to evacuate safely the ammonia released during the method.

Step 1) is preferably performed at a temperature ranging from about 0° C. to about 60° C., more preferably at a temperature ranging from about 0° C. to about 50° C., more preferably at a temperature ranging from about 20° C. to about 60° C., and more preferably at a temperature ranging from about 20° C. to about 50° C.

Step 1) can be carried out for a time ranging from about 5 to about 180 minutes, preferably from about 15 to about 120 minutes, and more preferably from about 15 to about 60 minutes.

During step 1), the $NH_4$ solution incorporates into the pores of the starting crystalline zeolite material.

Step 1) can be conducted thanks to an ultrasonic bath. Ultrasounds substantially accelerate the kinetics of the reaction and can therefore reduce the time of contacting the crystalline zeolite material with the $NH_4F$ solution to several minutes.

The $NH_4F$ solution used in step 1) can be previously prepared by dissolving solid $NH_4F$ in a solvent according to a step $1_0$).

The pH of the $NH_4F$ solution prepared before step 1) (i.e. after step $1_0$)) is preferably about 7.

The solvent can be selected from water, methanol, ethanol, acetone, and mixtures thereof. Water is preferred so as to form a $NH_4F$ aqueous solution.

During the contacting step 1), the pH of the resulting mixture is about 8.0 or greater than about 8.0.

The $NH_4F$ solution used in step 1) has preferably a $NH_4F$ mass concentration of at least about 20 wt %.

In one preferred embodiment, the $NH_4F$ solution has a $NH_4F$ mass concentration from about 15 wt % to about 50 wt %, and preferably from about 20 wt % to about 40 wt %.

In one preferred embodiment, the mass ratio of solid $NH_4F$/starting crystalline zeolite material used in step 1) ranges from about 0.5 to about 25, preferably from about 1 to about 10, and more preferably from about 1.2 to 10.

Since the starting crystalline zeolite material is used as a dry compound, step 1) is preferably carried out by contacting the starting crystalline zeolite material with the whole $NH_4F$ solution in only one go and/or rapidly. Thus, the starting crystalline zeolite material and the $NH_4F$ solution are mixed instantly during step 1). In other words, step 1) is not carried out by adding dropwise and/or slowly the $NH_4F$ solution on the starting crystalline zeolite material. This only one go and/or rapid contacting step 1) favors the saturation of the starting crystalline zeolite pores with concentrated $NH_4F$ solution.

More particularly, step 1) can be performed by:
- immersing the starting crystalline zeolite material (in the form of a dry compound) in the $NH_4F$ solution to form a heterogeneous mixture (i.e. immersed mixture), and then by stirring said heterogeneous mixture (i.e. immersed mixture); or
- pouring the $NH_4F$ solution on the starting crystalline zeolite material (in the form of a dry compound) so as to saturate its micropore volume, and then by filtrating it so as to remove the excess of $NH_4F$ solution and to form an impregnated solid.

Thus, the resulting mixture formed in step 1) can be either a heterogeneous mixture (i.e. immersed mixture) or an impregnated solid.

If step 1) is performed by immersing the starting crystalline zeolite material in the $NH_4F$ solution to form a heterogeneous mixture, and then by stirring said heterogeneous mixture, the starting crystalline zeolite material has a total pore volume $V_m$ and the $NH_4F$ solution has a volume $V_{sol}$, with $V_{sol}$ being preferably much larger than $V_m$. As an example, $V_{sol}/V_m \geq 5$, and preferably $V_{sol}/V_m \geq 10$.

Then, after the contacting step 1), the method comprises before the washing step 2) a step of filtrating the heterogeneous mixture to obtain a solid.

If step 1) is performed by pouring the $NH_4F$ solution on the starting crystalline zeolite material so as to saturate its micropore volume, and then by filtrating it so as to remove the excess of $NH_4F$ solution and to form an impregnated solid, the crystalline zeolite material has a volume $V_{m'}$ and the $NH_4F$ solution has a volume $V_{sol'}$, with $V_{sol'}$ being preferably approximately equal to $V_{m'}$.

The immersing method is preferred.

The washing step 2) is then performed either on the solid obtained according to the immersing method, or on the impregnated solid obtained according to the pouring method.

The washing step 2) can be carried out several times so as to remove all the fluoride species from the synthetic crystalline zeolite material.

The washing step 2) is preferably performed four or five times, in particular with water.

Step 3) can be performed at a temperature ranging from about 60° C. to about 100° C., preferably in an oven with air flow.

After step 2) or step 3), the synthetic crystalline zeolite material prepared according to the method of the present invention already displays the desired microporosity and eventually desired mesoporosity.

Thus, the method of the present invention preferably does not comprise any step so as to increase the mesoporosity of the synthetic crystalline zeolite material obtained in step 2) or in step 3).

As an example, the method of the invention does not involve the use of one or more sacrificial templates (e.g. hydrocarbons or carbon particles) which are conventionally incorporated in a zeolite material during the synthesis and then burned out (i.e. calcined) to leave behind and create mesopores.

Once the synthetic crystalline zeolite material is recovered according to step 3), it may be ion exchanged according to a step 4).

Typical ion exchange techniques involve contacting the synthetic crystalline zeolite material obtained in step 3) with a solution containing a salt of the desired replacing cation or cations. As an example, alkali metal cations can be removed and replaced with a proton ($H^+$), ammonium ($NH_4^+$), or any desired metal or organic cation.

When the synthetic crystalline zeolite material is in the $NH_4^+$-form after step 3) or after the ion-exchange step 4), it can be calcined in air or inert gas according to a step 5), so as to remove ammonia and produce the synthetic crystalline zeolite material in the $H^+$-form (acidic form).

This acidic form is required when the material is used as a catalyst in acid-catalyzed reactions such as most of the oil refining and petrochemical reactions.

Step 5) can be performed at temperatures ranging from about 380° C. to about 550° C., for periods of time ranging from about 1 to about 5 hours, to produce a synthetic crystalline zeolite material in acidic form.

After, this calcination step 5), the synthetic crystalline zeolite material can be directly used as a catalyst.

It is noted that the acidic form is not required when the material is used as a catalyst in base-catalyzed reactions such as side chain alkylation reactions of aromatic hydrocarbons.

According to a preferred embodiment of the invention, the method does not comprise any calcination step, except for removing ammonia when the synthetic crystalline zeolite material obtained in step 3) or 4) is in the $NH_4^+$-form (i.e. synthetic crystalline zeolite material comprising $NH_4^+$ cations).

Within the meaning of the present invention, the term "calcination" is understood to mean a heat treatment at a temperature going from 380° C. to 700° C., during 1 to 10 hours, under an air, oxygen or inert ($N_2$) atmosphere.

The synthetic crystalline zeolite material prepared according to the method of the present invention can be functionalized according to a step 6) with active (metal or organic) compounds thanks to its newly created mesopores, thus allowing for the catalytic processing of bulky molecules that cannot be processed in untreated zeolites. Thus, the method can further comprise a step 6) of functionalizing said synthetic crystalline zeolite material with at least one active (metal or organic) compound.

Said active (metal, inorganic, or organic) compounds can be chosen from metals, metal oxides, metal sulphides, metal carbides, metal phosphides, large organic and organometallic molecules, zeolites different from said synthetic crystalline zeolite material, and re-crystallized synthetic crystalline zeolite material. The functionalization opens the route to encapsulation of active species in the synthetic zeolite material crystal volume.

Said step 6) can be performed after step 3), step 4) or step 5).

The method of the invention does not comprise before the contacting step 1), any step of mixing the starting crystalline zeolite material with an aqueous or organic solvent to form a suspension or a solution of said starting crystalline zeolite material, since the starting crystalline zeolite material used in step 1) is in the form of a dry compound.

The synthetic crystalline zeolite material obtained by the method of the present invention can comprise micropores having a mean dimension of more than about 1 nm, preferably of more than about 1.5 nm.

The synthetic crystalline zeolite material obtained by the method of the present invention can further comprise mesopores having a mean dimension of about 2 to 25 nm, preferably of about 2 to 15 nm, and more preferably of about 2 to 6 nm.

The size of the mesopores and/or the micropores can be controlled by the $NH_4F$ mass concentration of the $NH_4F$ solution, the temperature and the time of the contacting step 1).

The synthetic crystalline zeolite material obtained by the method of the present invention preferably does not comprise macropores.

The method of the present invention can lead to a synthetic crystalline zeolite material having a Si/Al molar ratio equal or greater than 1.0, preferably more than 1.6, more preferably of between about 1.6 and 1000, and more preferably of between about 1.6 and 100.

The synthetic crystalline zeolite material obtained can be chosen from FAU-type zeolite materials (FAU-Y), MFI-type zeolite materials (ZSM-5 or silicate-1), MOR-type zeolite materials, LTL-type zeolite materials, and any other type of zeolite materials which contains silicon and aluminum in its framework such as Beta zeolite materials.

FAU-Y, ZSM-5, MOR-type, LTL-type, and Beta zeolite materials are preferred.

FAU-Y, LTL-type and MOR-type zeolite materials are more preferred.

In a first embodiment, the synthetic crystalline zeolite material obtained by the method of the invention is a FAU-type zeolite material, and preferably a Y-type zeolite having a Si/Al molar ratio ranging from 2.5 to 30.

In a second embodiment, the synthetic crystalline zeolite material obtained by the method of the invention is a MFI-type zeolite material, and preferably a ZSM-5-type zeolite, having a Si/Al molar ratio ranging from 15 to 100.

The method of the present invention does not substantially change the Si/Al molar ratio.

Within the meaning of the present invention, the term "the method of the present invention does not substantially change the Si/Al molar ratio means that the Si/Al molar ratio of the starting crystalline zeolite material cannot vary during the method of the present invention of more than about 2, and preferably of more than about 1, and more preferably of more than about 0.1.

The synthetic crystalline zeolite material obtained by the method of the present invention can further comprise monovalent or divalent cations M', preferably selected from $Na^+$, $K^+$, $Mg^{2+}$, $Ca^{2+}$, $H^+$, and $NH_4^+$.

The method of the present invention can lead to an increase of the total pore volume of at least about 15%, preferably of at least about 20%, preferably of at least about 30%, and more preferably of at least about 50%, with respect to the total pore volume of the starting crystalline zeolite material.

The method of the present invention can lead to an increase of the specific surface area of at least about 5%, preferably of at least about 7%, and more preferably of at least about 15%, with respect to the specific surface area of the starting crystalline zeolite material.

The method of the present invention can lead to an increase of the micropore volume of at least about 5% and preferably of at least about 10%, with respect to the micropore volume of the starting crystalline zeolite material.

The method of the present invention can lead to an increase of the mesopore volume of at least about 50%, preferably of at least about 80%, and more preferably of at least about 100%, with respect to the mesopore volume of the starting crystalline zeolite material, while at least maintaining the micropore volume of the starting crystalline zeolite material.

The synthetic crystalline zeolite material obtained by the method of the present invention can have a mesopore volume of at least about 0.05 $cm^3/g$, preferably of at least about 0.08 $cm^3/g$, preferably of at least about 0.15 $cm^3/g$, and more preferably of at least about 0.2 $cm^3/g$.

The synthetic crystalline zeolite material obtained by the method of the present invention can have a specific surface area of at least about 350 $m^2/g$, and preferably ranging from about 400 $m^2/g$ to about 800 $cm^2/g$.

The synthetic crystalline zeolite material obtained by the method of the present invention can have a micropore volume of at least about 0.1 $cm^3/g$, preferably of at least about 0.15 $cm^3/g$, and more preferably of at least about 0.2 $cm^3/g$.

A second object of the present invention is a synthetic crystalline zeolite material prepared according to the method of the present invention, said synthetic crystalline zeolite material comprising micropores and eventually mesopores, and having a silicon to aluminum molar ratio Si/Al≥1.

The synthetic crystalline zeolite material is as defined in the first object of the present invention.

The synthetic crystalline zeolite material prepared according to the method of the present invention has intra-particles porosity. Thus, the synthetic crystalline zeolite material differs from the zeolites of the prior art with textural meso-/macroporosity which is a consequence of agglomeration of single zeolite particles.

The enhancement of zeolite porosity in the method of the present invention is achieved by internal-surface dissolution through 1) saturation and 2) dissolution of zeolite pores with concentrated $NH_4F$ solution, whereas in the methods of the prior art, it is achieved by outer-surface dissolution of zeolite crystals.

Indeed, the method of the present invention is based on the etching of zeolite crystals. Thus, the enhanced pore volume is namely due to the changes in the volume of the single crystal. The method of the present invention does not include the formation of inter-particles porosity since the main contribution comes from the dissolution of individual zeolite particles so as to create intra-particles porosity. Intra-particles porosity can be observed by transmission electron microscopy and is characterized by the presence of pores with size larger than 2 nm in the volume of the single zeolite crystals. On the contrary, inter-particles porosity is characterized by the presence of single crystals aggregation. Indeed, the space (or the voids) among the obtained aggregated single zeolite crystals is taken as another type of mesopore or macropores depending on the size of the voids and is called inter-particles meso-/macroporosity.

A third object of the present invention is the use of the method of the present invention so as to increase the total pore volume of a crystalline zeolite material which is essentially microporous.

The total pore volume is increased by either an increase of the micropore volume only or an increase of the mesopore volume while maintaining or increasing the micropore volume.

A fourth object of the present invention is the use of the method of the present invention so as to introduce micropores having a mean dimension of more than about 1 nm, and preferably of more than about 1.5 nm and/or to introduce mesopores having a mean dimension of about 2 to about 25 nm, and preferably of about 2 to about 15 nm while maintaining or increasing the micropore volume, in a crystalline zeolite material which is essentially microporous.

A fifth object of the present invention is the use of the synthetic crystalline zeolite material prepared according to the method of the present invention, as a catalyst or adsorbent in gas-solid and liquid-solid reactions (e.g. heterogeneous catalytic reactions), as seed crystals for zeolite material synthesis, and for the preparation of membranes or layers (films).

In a preferred embodiment, the synthetic crystalline zeolite material prepared according to the method of the present invention is used as a catalyst to transform bulky molecules, for example in oil refining and petrochemistry (e.g. fluid catalytic cracking, hydrocracking, etc. . . . ).

Within the meaning of the present invention, the term "bulky molecule" is understood to mean an organic molecule having a kinetic diameter of more than 0.9 nm, such as 1, 3, 5-tri-iso-propylbenzene (TIPB), and preferably of more than 0.95 nm.

Examples of heterogeneous catalytic reactions are hydrocarbon conversion reactions which include isomerization of $C_5$ and $C_6$ compounds to increase the octane of gasoline, hydrocracking, fluid catalytic cracking, iso-butane alkylation for fuels, aromatics processing, olefins oligomerization, biomass (oxygenated hydrocarbons) upgrading.

Indeed, the large presence of these uniformly distributed mesopores in the volume of the synthetic crystalline zeolite material can serve as superior transfer stations between inner part and outside surface of the zeolite material, and between different microporous zones of the zeolite material volume. The system of mesopores can also serve as a trap for the bulky compounds and prevent from the blocking of pores.

A sixth object of the present invention is the use of the synthetic crystalline zeolite material prepared according to the method of the present invention, to incorporate active (metal, inorganic, or organic) compounds thanks to its newly created micro- and/or mesoporous network.

The obtained synthetic crystalline zeolite material (i.e. the functionalized synthetic crystalline zeolite material) can then be used as a catalyst or adsorbent in gas-solid and liquid-solid reactions (e.g. heterogeneous catalytic reactions), as seed crystals for zeolite material synthesis, and for the preparation of membranes or layers (films).

The synthetic crystalline zeolite material prepared according to the method of the present invention can also be used for medical, pharmaceutical and cosmetic purposes, environmental drug delivery, medical imaging, and other biomedical applications, as well as for chemical sensing and optical devices.

The synthetic crystalline zeolite material prepared according to the method of the present invention can also be incorporated in matrices such as $SiO_2$, $Al_2O_3$, or amorphous silica-alumina matrices, so as to be shaped by known techniques such as spray drying, oil-drop, extrusion, pelletizing or tableting.

BRIEF DESCRIPTION OF THE DRAWINGS

FIGS. 8-10b are images of samples of material from example 3 in accordance with one embodiment;

DETAILED DESCRIPTION

Examples

Figure 1:
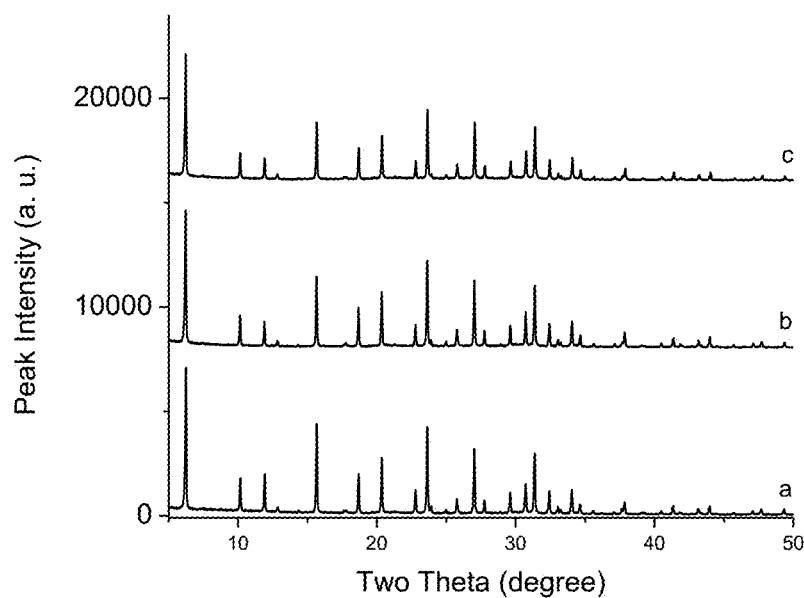
FIG. 1 is a graph of peak intensity vs degree of a material from example 1 in accordance with one embodiment.

The starting materials used in the examples which follow, are listed below:

solid $NH_4F$: ≥98.0% purity, Sigma Aldrich;

Commercial zeolite Y produced by UOP under the commercial brand LZY-62 having a Si/Al molar ratio of 2.6 and a size of crystals of 0.5 to 1 μm was used as a starting crystalline zeolite material;

Commercial zeolite ZSM-5 produced by Süd Chemie (Clariant) under the commercial brand MFI-55 ($NH_4$-form) having a Si/Al molar ratio of 21.3 and a size of crystals of 5 μm was used as a starting crystalline zeolite material;

Commercial zeolite MOR produced by Zeolyst under the commercial brand CBV 10A having a Si/Al molar ratio of 6.7 and a size of crystals of 0.1-0.2 μm was used as a starting crystalline zeolite material;

Commercial zeolite LTL produced by Zeolyst under the commercial brand Zeolite L ($14/10436$) having a Si/Al molar ratio of 3.3 and a size of crystals of 0.2~0.5 μm was used as a starting crystalline zeolite material.

Unless noted otherwise, these starting materials were used as received from the manufacturers, without additional purification.

The various zeolites obtained in the examples were characterized over various scales of sizes.

Powder X-Ray Diffraction (XRD) Analysis:

Powder samples of the synthetic crystalline zeolite materials obtained after step 3) and starting crystalline zeolite materials were analyzed using a PANalytical X'Pert Pro diffractometer with CuKα monochromatized radiation (λ=1.5418 Å). The samples were scanned in the range 5-50° 2θ with a step size of 0.02°.

$N_2$ Sorption Analysis:

Nitrogen adsorption/desorption isotherms were measured using Micrometrics ASAP 2020 volumetric adsorption analyzer. Samples of the synthetic crystalline zeolite materials obtained after step 3) and starting crystalline zeolite materials were degassed at 573 K under vacuum overnight prior to the measurement. The micropore volume was estimated by Nonlocal Density Functional Theory (NLDFT). The volume adsorbed at $P/P_0$=0.99 represents the total pore volume. The mesopore volume was estimated by the difference between the total pore volume and the micropore volume. The micropore and mesopore size distributions of solids were estimated by NLDFT and Barret-Joyner-Halenda (BJH) methods, respectively. The specific surface area was estimated by the Brunauer-Emmett-Teller (BET) method.

Chemical Analysis:

The chemical compositions (e.g. Si/Al molar ratios) of the synthetic crystalline zeolite materials obtained after step 3) were determined by inductively coupled plasma (ICP) optical emission spectroscopy using a Varian ICP-OES 720-ES.

Transmission Electron Microscopy (TEM):

Ethanol suspensions of the synthetic crystalline zeolite materials obtained after step 3) were sonicated for 15 min and then 2-3 drops of said suspensions were dried on carbon-film-covered 300-mesh copper electron microscope grids. The crystal size, morphology and crystallinity of solids were determined by a transmission electron microscopy (TEM) using a JEOL100CX microscope operating at 200 kV.

Ammonium Exchange and Thermal Treatment:

When the starting crystalline zeolite materials or the synthetic crystalline zeolite materials obtained after step 3) are not in the $NH_4^+$- or $H^+$-form, they were ion-exchanged with a solution of 0.2M of $NH_4Cl$ (1 h, 25° C.). The ion-exchange procedure was repeated 2 times. After the third ion exchange step, the crystalline zeolite materials were washed with distilled water, and calcined (e.g. at 550° C.) for elimination of the $NH_3$ and obtaining the crystalline zeolite materials in acidic form.

Scanning Electron Microscopy (SEM):

The surface features, morphology and size of zeolite materials were determined by a MIRA-LMH (TESCAN) scanning electron microscope (SEM) equipped with a field emission gun. The accelerating voltage was 30 kV. All samples prior the SEM characterization were covered with a Pt—Pd conductive layer.

Example 1

Preparation of Synthetic Crystalline Zeolite Materials $Y_1$ and $Y_2$ According to the Method of the Invention and Characterization Thereof

Example 1-1

Step 1):

A $NH_4F$ solution was prepared by mixing 10 g of solid $NH_4F$ with 30 g of distilled water. The $NH_4F$ solution had a mass concentration of 25 wt %. Then, 7.5 g of starting crystalline zeolite material Y was immersed into the $NH_4F$ solution described above to form a heterogeneous mixture. Then, the heterogeneous mixture was treated at 0° C. for 30 minutes under stirring and ultrasounds, and was filtrated to obtain a solid.

Steps 2) and 3):

Then, the obtained solid was thoroughly washed with distilled water and dried at 100° C.

A synthetic crystalline zeolite material $Y_1$ with a Si/Al molar ratio of 2.6 was obtained.

The yield was 90%.

Example 1-2

The same method as the one described in example 1-1 was used except that in step 1), the treatment was performed at 0° C. for 60 minutes. A synthetic crystalline zeolite material $Y_2$ with a Si/Al molar ratio of 2.7 was obtained.

The yield was 85%.

The Si/Al molar ratio and porosity properties [the specific surface area ($S_{BET}$), the micropore volume ($V_{micro}$), the mesopore volume ($V_{meso}$), and the total pore volume ($V_{total}$)] of the starting crystalline zeolite material Y and of the prepared synthetic crystalline zeolite materials $Y_1$ and $Y_2$ are given in Table 1 below:

The specific surface area and porosity properties of the crystalline zeolite materials were obtained by $N_2$ sorption measurements.

TABLE 1

| crystalline zeolite material | Si/Al molar ratio | $S_{BET}$ ($m^2 \cdot g^{-1}$) | $V_{micro}$ ($cm^3 \cdot g^{-1}$) | $V_{meso}$ ($cm^3 \cdot g^{-1}$) | $V_{total}$ ($cm^3 \cdot g^{-1}$) |
|---|---|---|---|---|---|
| Y | 2.6 | 652 | 0.29 | 0.07 | 0.36 |
| $Y_1$ | 2.6 | 750 | 0.35 | 0.07 | 0.42 |
| $Y_2$ | 2.7 | 755 | 0.31 | 0.13 | 0.44 |

Hence, Table 1 clearly shows that the method of the present invention leads to the increase of the micropore volume and optionally to the introduction of a secondary porosity, and therefore allows in both examples 1-1 and 1-2 the increase of the total pore volume of the starting crystalline zeolite material. Indeed, in $Y_1$, it is only observed an increase of the micropore volume, whereas in $Y_2$, both the micropore volume and the mesopore volume are increased. The chemical analyses revealed that the Si/Al ratio only slightly increased from 2.6 to 2.7 in example 1-2.

As it can be also seen in Table 1, the method of the present invention allows under certain conditions to increase the micropore volume without changing the mesopore volume of material (cf. synthetic crystalline zeolite material $Y_1$). The formation of mesopores (2-10 nm) is only observed in synthetic crystalline zeolite materials $Y_2$.

In addition, FIG. 1 represents the Powder X-ray diffraction (XRD) of the starting crystalline zeolite material Y (FIG. 1*a*), the synthetic crystalline zeolite material $Y_1$ (FIG. 1*b*) and the synthetic crystalline zeolite material $Y_2$ (FIG. 1*c*), and shows the intensity (in arbitrary units, a.u.) as a function of two theta (in degree). FIG. 1 reveals high crystallinity and no indications of amorphous phase formation after the contacting step 1).

Figure 2:
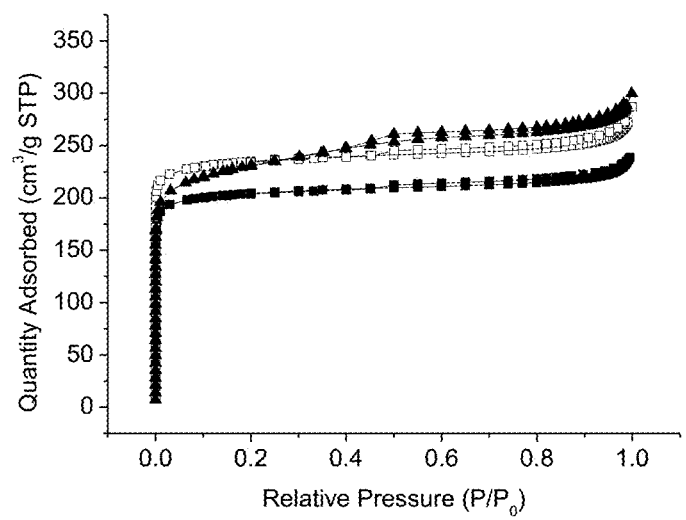
FIG. 2 is a graph of quantity absorbed vs relative pressure of a material from example 1 in accordance with one embodiment.

FIG. 2 represents the nitrogen adsorption/desorption isotherms of the starting crystalline zeolite material Y (FIG. 2, solid squares), the synthetic crystalline zeolite material $Y_1$ (FIG. 2, open squares) and the synthetic crystalline zeolite material $Y_2$ (FIG. 2, solid triangles), and shows the volume adsorbed (in $cm^3 \cdot g^{-1}$) as a function of the relative pressure $P/P_0$ (in units).

Nitrogen adsorption characterizes the porosity of the crystalline zeolite materials. According to FIG. 2, it can be concluded that the prepared synthetic crystalline zeolite material $Y_2$ exhibits a hysteresis loop related with the formation mesopores. After the pronounced uptake at low relative pressure, crystalline zeolite materials Y and $Y_1$ exhibit almost horizontal adsorption and desorption branches that shows no presence of mesopores. The synthetic crystalline zeolite material $Y_1$ shows higher uptake at low relative pressure which is characteristic of microporous zeolite type materials. This uptake is more intense in respect to the starting crystalline zeolite material Y revealing larger micropore volume of the synthetic crystalline zeolite material $Y_1$.

Figure 3:
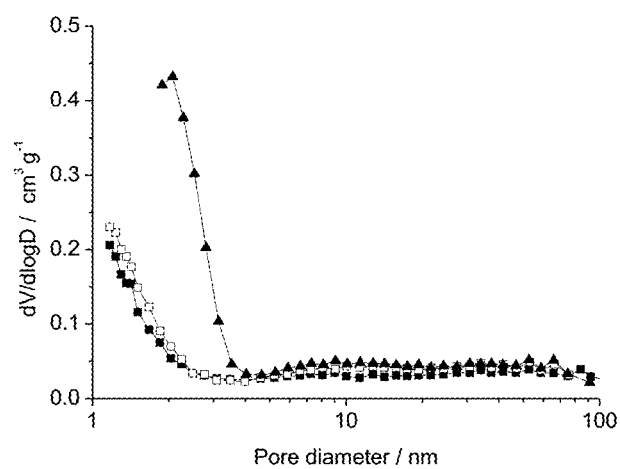
FIG. 3 is a graph of pore size distribution of a material from example 1 in accordance with one embodiment.

FIG. 3 represents the pore size distribution of the starting crystalline zeolite material Y (FIG. 3, solid squares), the synthetic crystalline zeolite material $Y_1$ (FIG. 3, open squares) and the synthetic crystalline zeolite material $Y_2$ (FIG. 3, solid triangles), and shows the pore volume calculated as dV/d log D (in $cm^3 \cdot g^{-1}$) as a function of the pore diameter (in nm).

FIG. 3 clearly reflects the production of additional mesoporosity. There is a right shift of the pore size distributions indicating that the synthetic crystalline zeolite material $Y_2$ comprises mesopores with a diameter ranging from 2 to 10 nm, and preferably from 2 to 4 nm.

Figure 4:
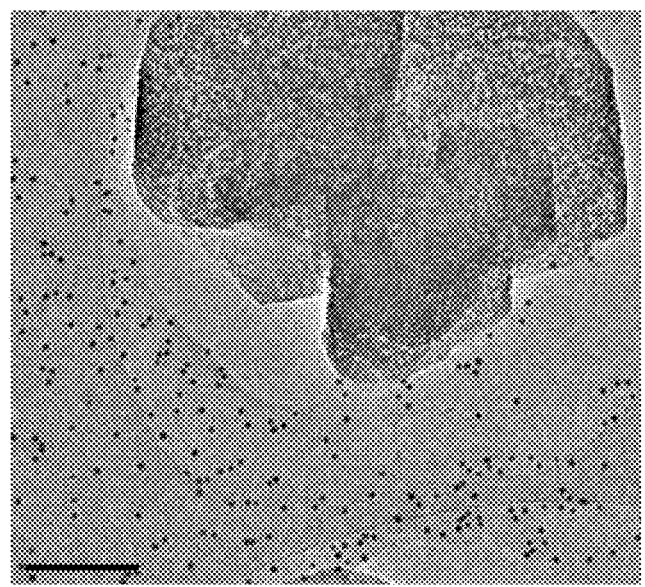
FIG. 4 is an image of a material of example 1 in accordance with one embodiment.

FIG. 4 shows representative electron micrograph of thin slices of the synthetic crystalline zeolite material $Y_2$ (FIG. 4) extracted from the electron tomography study. The set of experimental data obtained with complementary methods (TEM, TEM tomography, nitrogen adsorption, etc. . . . ) unambiguously shows that the mesopores are similar in size in the synthetic crystalline zeolite material, and they are uniformly distributed throughout the volume of the synthetic crystalline zeolite materials. In addition, FIG. 4 clearly shows intra-particles porosity induced by internal-surface dissolution.

Example 2

Catalytic Activity of Synthetic Crystalline Zeolite Materials $Y_1$ and $Y_2$

A test was performed to evaluate the catalytic activity of the synthetic crystalline zeolite materials prepared according to the method of the invention.

The synthetic crystalline zeolite materials $Y_1$ and $Y_2$ prepared in example 1 and the starting crystalline zeolite material Y were further ion-exchanged with ammonium cations (step 4) and heated at 550° C. to eliminate $NH_3$ (step 5) and obtain respectively the synthetic crystalline zeolite materials in acidic form $Y'_1$ and $Y'_2$ and the starting crystalline zeolite material in acidic form $Y'$ (also called synthetic and starting crystalline zeolite catalysts).

Then, the conversion of a bulky molecule 1,3,5-triisopropylbenzene (TIPB) in the presence of crystalline zeolite catalyst $Y'_1$, $Y'_2$ or $Y'$ was studied. The tests were performed under identical conditions [$P_{Tot}$=101325 Pa, $P_{TIPB}$=192 Pa, and weight/feed flow rate $(W/F°_{TIPB})$=1.27×10$^3$ g·min· mol$^{-1}$] in a downflow fixed bed gas phase reactor at a temperature of 225° C.

Figure 5:
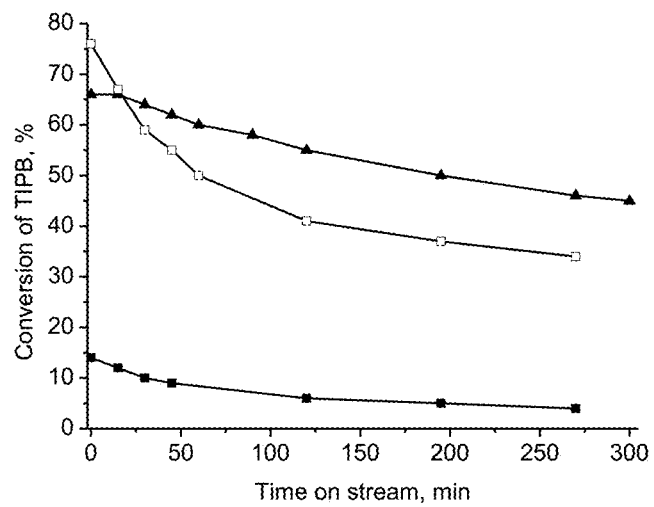
FIG. 5 is a graph of conversion vs time of a material from example 2 in accordance with one embodiment.

FIG. 5 represents the conversion of TIPB (in %) as a function of time on stream (in minutes) for the synthetic crystalline zeolite catalyst $Y'_1$ (FIG. 5, open squares), the synthetic crystalline zeolite catalyst $Y'_2$ (FIG. 5, solid triangles) and the starting crystalline zeolite catalyst $Y'$ (FIG. 5, solid squares).

The kinetic diameter of TIPB is 0.95 nm, which is larger than the pore opening of the commercial crystalline zeolite material Y (i.e. 0.74 nm). The substantially higher activity of the synthetic crystalline zeolite catalysts $Y'_1$ and $Y'_2$ in comparison to the starting crystalline zeolite catalyst $Y'$ is a strong evidence that the method of the present invention leads to the modification of the porous network of the starting crystalline zeolite material Y which is essentially microporous. The method obviously expands pore dimensions and thus bulkier molecules are able to reach more active sites of the crystalline zeolite material. The method would allow a more efficient use of currently used zeolite catalysts in, for instance, oil refining (in particular cracking reactions where the molecular mass of the reactant is drastically reduced) and petrochemistry. In addition, the method of the invention would also allow the preparation of new synthetic crystalline zeolite catalysts able to process much bulkier molecules than those currently used in the industry.

Example 3

Preparation of Synthetic Crystalline Zeolite Materials ZSM-5$_a$, ZSM-5$_b$, ZSM-5$_c$, ZSM-5$_d$, ZSM-5$_e$, ZSM-5f, and ZSM-5$_g$ According to the Method of the Invention and Characterization Thereof Example 3-1

Step 1):
A $NH_4F$ solution was prepared by mixing 80 g of solid $NH_4F$ with 120 g of distilled water. The $NH_4F$ solution had a mass concentration of 40 wt %. Then, 10 g of starting crystalline zeolite material ZSM-5 was immersed into the $NH_4F$ solution described above to form a heterogeneous mixture. The heterogeneous mixture was treated at 50° C. for 5 minutes under stirring and ultrasounds, and was filtrated to obtain a solid.

Steps 2) and 3):
Then, the obtained solid was thoroughly washed with distilled water and dried at 100° C. for 10 h.
A synthetic crystalline zeolite material ZSM-5$_a$ with a Si/Al molar ratio of 22.3 was obtained.

Example 3-2

The same method as the one described in example 3-1 was used except that in step 1), the treatment was performed at 50° C. for 15 minutes. A synthetic crystalline zeolite material ZSM-5$_b$ with a Si/Al molar ratio of 22.5 was obtained.

Example 3-3

The same method as the one described in example 3-1 was used except that in step 1), the treatment was performed at 50° C. for 22.5 minutes. A synthetic crystalline zeolite material ZSM-5$_c$ with a Si/Al molar ratio of 22.0 was obtained.

Example 3-4

The same method as the one described in example 3-1 was used except that in step 1), the treatment was performed at 50° C. for 30 minutes. A synthetic crystalline zeolite material ZSM-5$_d$ with a Si/Al molar ratio of 22.1 was obtained.

Example 3-5

The same method as the one described in example 3-1 was used except that in step 1), the treatment was performed at 50° C. for 45 minutes. A synthetic crystalline zeolite material ZSM-5$_e$ with a Si/Al molar ratio of 22.8 was obtained.

Example 3-6

The same method as the one described in example 3-1 was used except that in step 1), the treatment was performed at 50° C. for 60 minutes. A synthetic crystalline zeolite material ZSM-5$_f$ with a Si/Al molar ratio of 23.2 was obtained.

Example 3-7

The same method as the one described in example 3-1 was used except that in step 1), the treatment was performed at 50° C. for 120 minutes. A synthetic crystalline zeolite material ZSM-5$_g$ with a Si/Al molar ratio of 23.4 was obtained.

The Si/Al molar ratio and porosity properties [the specific surface area (S$_{BET}$), the micropore volume (V$_{micro}$), the mesopore volume (V$_{meso}$), and the total pore volume (V$_{total}$)] of the starting crystalline zeolite material ZSM-5 and of the prepared synthetic crystalline zeolite materials ZSM-5$_a$, ZSM-5$_b$, ZSM-5$_c$, ZSM-5$_d$, ZSM-5$_e$, ZSM-5$_f$ and ZSM-5$_g$ are given in Table 2 below:

The specific surface area and porosity properties of the crystalline zeolite materials were obtained by N$_2$ sorption measurements.

TABLE 2

| crystalline zeolite material | Si/Al molar ratio | S$_{BET}$ (m$^2 \cdot$g$^{-1}$) | V$_{micro}$ (cm$^3 \cdot$g$^{-1}$) | V$_{meso}$ (cm$^3 \cdot$g$^{-1}$) | V$_{total}$ (cm$^3 \cdot$g$^{-1}$) |
|---|---|---|---|---|---|
| ZSM-5 | 21.3 | 377 | 0.18 | 0.02 | 0.20 |
| ZSM-5$_a$ | 22.3 | 368 | 0.18 | 0.07 | 0.25 |
| ZSM-5$_b$ | 22.5 | 391 | 0.17 | 0.09 | 0.26 |
| ZSM-5$_c$ | 22.0 | 394 | 0.17 | 0.12 | 0.29 |
| ZSM-5$_d$ | 22.1 | NA | NA | NA | NA |
| ZSM-5$_e$ | 22.8 | 405 | 0.17 | 0.22 | 0.39 |
| ZSM-5$_f$ | 23.2 | 395 | 0.17 | 0.28 | 0.45 |
| ZSM-5$_g$ | 23.3 | NA | NA | NA | NA |

NA: not analyzed

Table 2 clearly shows that the method of the present invention leads to the introduction of a secondary porosity while maintaining the starting micropore volume, and allows the increase of the total pore volume of the starting crystalline zeolite material (increase of 125% with respect to the starting total pore volume in example 3-6). The chemical analyses revealed that the Si/Al ratio only slightly increased from 21.3 to 23.3. These results are in sharp contrast to the conventional desilication or steaming dealumination approaches currently used for the creation of mesopores in zeolite framework, which change substantially the Si/Al ratio of the starting zeolite materials.

Figure 6:
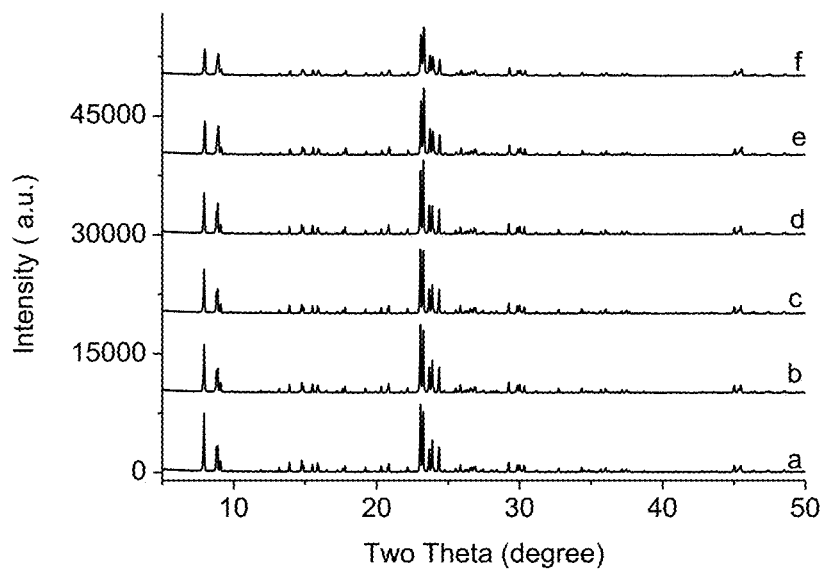
FIG. 6 is a graph of intensity vs degree of a material from example 3 in accordance with one embodiment.

In addition, FIG. 6 represents the Powder X-ray diffraction (XRD) of the starting crystalline zeolite material ZSM-5 (FIG. 6a), the synthetic crystalline zeolite material ZSM-5$_a$ (FIG. 6b), the synthetic crystalline zeolite material ZSM-5$_b$ (FIG. 6c), the synthetic crystalline zeolite material ZSM-5$_c$ (FIG. 6d), the synthetic crystalline zeolite material ZSM-5$_e$ (FIG. 6e) and the synthetic crystalline zeolite material ZSM-5$_f$ (FIG. 6f), and shows the intensity (in arbitrary units, a.u.) as a function of two theta (in degree). FIG. 6 reveals high crystallinity and no indications of amorphous phase formation after step 1).

Figure 7:
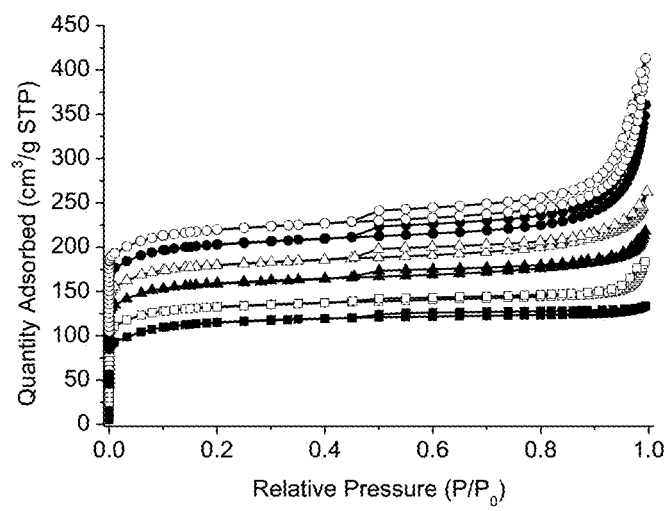
FIG. 7 is a graph of quantity absorbed vs relative pressure of a material from example 3 in accordance with one embodiment.

FIG. 7 represents the nitrogen adsorption/desorption isotherms of the starting crystalline zeolite material (FIG. 7, solid squares), the synthetic crystalline zeolite material ZSM-5$_a$ (FIG. 7, open squares), the synthetic crystalline zeolite material ZSM-5$_b$ (FIG. 7, solid triangles), the synthetic crystalline zeolite material ZSM-5$_c$ (FIG. 7, open triangles) the synthetic crystalline zeolite material ZSM-5$_e$ (FIG. 7, solid circles) and the synthetic crystalline zeolite material ZSM-5$_f$ (FIG. 7, open circles), and shows the volume adsorbed (in cm$^3 \cdot$g$^{-1}$) as a function of the relative pressure P/P$_0$ (in units). For clarity reasons, the isotherms are shifted in Y direction (i.e. ordinate direction) by +20, +40, +60, +80, +100 cm$^3$ g$^{-1}$, for the synthetic crystalline zeolite materials ZSM-5$_a$, ZSM-5$_b$, ZSM-5$_c$, ZSM-5$_e$, ZSM-5$_f$, respectively.

FIG. 7 shows that the starting crystalline zeolite material exhibits a typical Type I adsorption-desorption isotherm usually obtained for a microporous type material. Depending on the step 1) conditions, the synthetic crystalline zeolite materials change their surface/porous characteristics. More deeply treated crystalline zeolite materials (e.g. ZSM-5$_e$ and ZSM-5$_f$) exhibit a combination of Type I and Type IV adsorption-desorption isotherms. In other words, besides the sharp uptake at low relative pressure which is characteristic of zeolite type materials, a second uptake with hysteresis loop is observed at high relative pressure. The hysteresis loop is characteristic of the formation of pores or cavities with mesoporous dimensions.

The analysis of pore size distribution of the starting crystalline zeolite material ZSM-5 and the synthetic crystalline zeolite materials ZSM-5$_a$, ZSM-5$_b$, ZSM-5$_c$, ZSM-5$_e$ and ZSM-5$_f$ showed the progressive formation of larger pores. The secondary porosity ranges from 4 to 100 nm depending on the contacting time of step 1).

Figure 8:
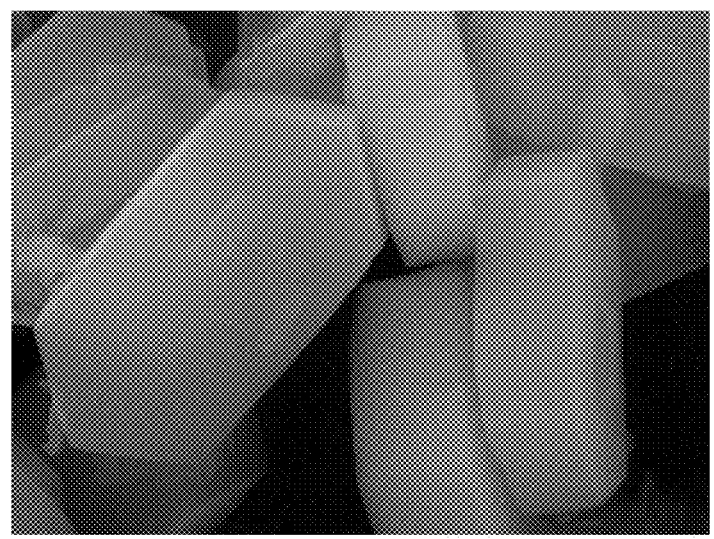
Figure 9:
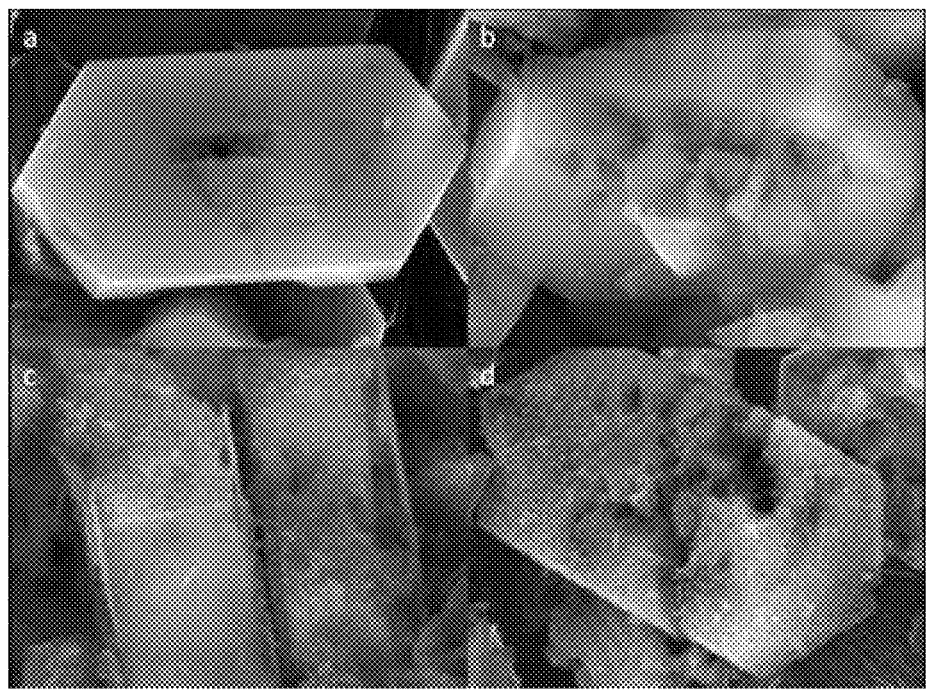
Figure 10:
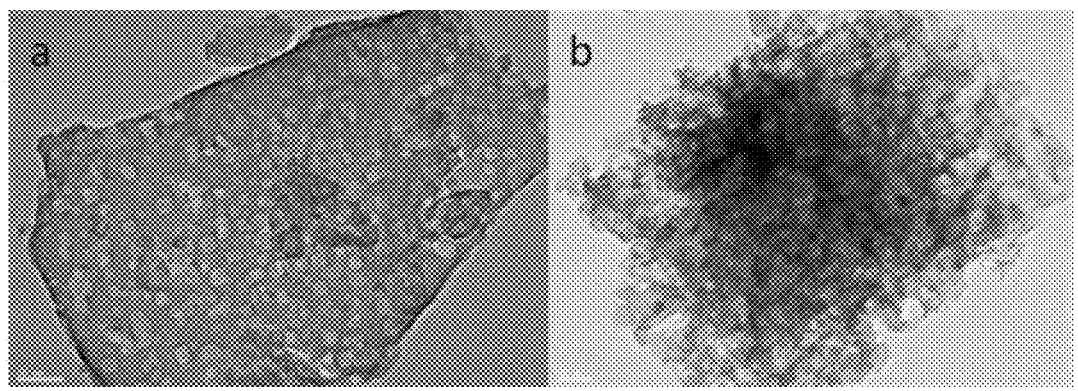

FIGS. 8, 9 and 10 represent the genesis and propagation of mesopores in the framework of the crystalline zeolite materials.

FIGS. 8, 9a, 9b, 9c and 9d represent scanning electron microscopy (SEM) images of the starting crystalline zeolite material ZSM-5 and the synthetic crystalline zeolite materials ZSM-5$_a$, ZSM-5$_c$, ZSM-5$_e$, ZSM-5$_f$, respectively. FIGS. 10a and 10b represent respectively transmission electron microscopy (TEM) images of the crystalline zeolite materials ZSM-5$_d$ and ZSM-5$_g$.

As it can be seen in FIG. 8 the starting crystalline zeolite material ZSM-5 has a flat surface. After 5 min of contacting time (cf. step 1)), FIG. 9a reveals the first traces of dissolution and the disappearance of the small intergrown domain. At the very early stages of zeolite dissolution, the more energetic defect zones are attacked. These are namely defect zones and intergrowth zones between well crystallized zeolite domains. Then, with the increase of contacting time, the crystals of the zeolite material become progressively dissolved. Defects, small intergrown crystals are progressively removed in the whole volume of zeolite crystals (FIG. 10a). Further dissolution leads to increase of the size of holes remaining after dissolution of intergrown crystallites. In the first stages, the dissolution process follows the form of removed particles and thus cavities and channels with rectangular shape can be seen. This dissolution mechanism leads to the mosaic structure shown in FIG. 10b. The fact that the NH$_4$F concentrated solution attacks first the defect parts of the crystals and thus, purifies the crystals from defects and intergrowth that have negative impact on the diffusion thorough zeolite channels, is another advantage of the present invention. FIG. 10 clearly shows intra-particles porosity induced by internal-surface dissolution.

An important consequence is the generation of secondary porosity as a function of crystal growth process. Hence, by controlling the nucleation and growth of zeolite material, the genesis and propagation of secondary pore structure can be controlled, while maintaining the micropore volume of the starting crystalline zeolite material.

Example 4

Catalytic Activity of Synthetic Crystalline Zeolite Materials ZSM-5$_a$, ZSM-5$_c$, ZSM-5$_d$ and ZSM-5$_e$ Tests were performed to evaluate the catalytic activity of the synthetic crystalline zeolite materials prepared according to the method of the invention.

The synthetic crystalline zeolite materials ZSM-5$_a$, ZSM-5$_c$, ZSM-5$_d$ and ZSM-5$_e$ prepared in example 3 and the starting crystalline zeolite material ZSM-5 were heat treated at 550° C. to eliminate NH$_3$ (step 5) and obtain respectively the synthetic crystalline zeolite materials in acidic form ZSM-5'$_a$, ZSM-5'$_c$, ZSM-5'$_d$ and ZSM-5'$_e$ and the starting crystalline zeolite material in acidic form ZSM-5 (also called synthetic and starting crystalline zeolite catalysts).

Then, the conversion of m-xylene in the presence of the crystalline zeolite catalysts ZSM-5', ZSM-5'$_a$, ZSM-5'$_c$, ZSM-5'$_e$ and ZSM-5'$_f$ and the conversion of 1,3,5-triisopropylbenzene (TIPB) in the presence of the crystalline zeolite catalysts ZSM-5', ZSM-5'$_a$, and ZSM-5'$_e$ were studied.

The tests to convert m-xylene were performed under identical conditions [P$_{Tot}$=101325 Pa, P$_{m-xylene}$=2500 Pa, and W/F°$_{m-xylene}$=7-87 g·h·mol$^{-1}$] in a downflow fixed bed gas phase reactor at a temperature of 350° C.

The tests to convert TIPB were performed under identical conditions [P$_{Tot}$=101325 Pa, P$_{m-xylene}$=192 Pa, and W/F°$_{TIPB}$=6.3727×10$^3$ g·min·mol$^{-1}$] in a downflow fixed bed gas phase reactor at a temperature of 300° C.

Figure 11:
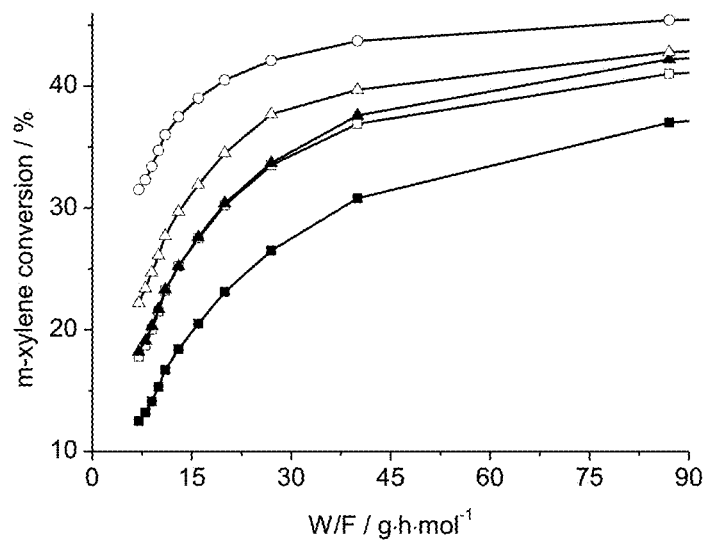
FIG. 11 is a graph of conversion vs. weight/feed flow rate of a material from example 4 in accordance with one embodiment.

FIG. 11 represents the conversion of m-xylene (in %) as a function of the weight/feed flow rate (in W/F°$_{m-xylene}$) for the crystalline zeolite catalysts ZSM-5' (FIG. 11, solid squares), ZSM-5'$_a$ (FIG. 11, open squares), ZSM-5'$_c$ (FIG. 11, solid triangles), ZSM-5'$_e$ (FIG. 11, open triangles) and ZSM-5'$_f$ (FIG. 11, open circles).

Figure 12:
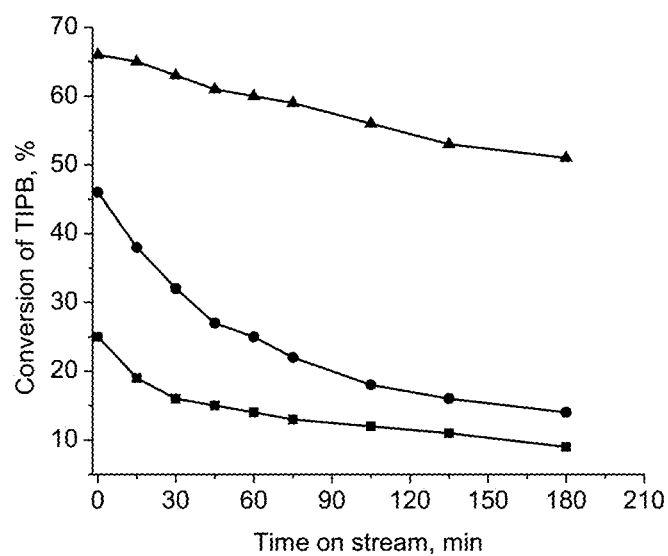
FIG. 12 is graph of conversion vs time of a material from example 4 in accordance with one embodiment.

FIG. 12 represents the conversion of TIPB (in %) as a function of time on stream (in minutes) for the crystalline zeolite catalysts ZSM-5' (FIG. 12, solid squares), ZSM-5'$_a$ (FIG. 12, solid circles), and ZSM-5'$_e$ (FIG. 12, solid triangles).

FIGS. 11 and 12 show that the synthetic crystalline zeolite catalysts prepared according the method of the invention exhibit substantially improved catalytic performances in both m-xylene and TIPB.

Example 5

Preparation of Synthetic Crystalline Zeolite Materials MOR$_1$ According to the Method of the Invention and Characterization Thereof Step 1):

A NH$_4$F solution was prepared by mixing 8 g of solid NH$_4$F with 32 g of distilled water. The NH$_4$F solution had a mass concentration of 20 wt %. Then, 5 g of starting crystalline zeolite material MOR was immersed into the NH$_4$F solution described above to form a heterogeneous mixture. Then, the heterogeneous mixture was stirred at 50° C. for 45 minutes and was filtrated to obtain a solid.

Steps 2) and 3):

Then, the obtained solid was thoroughly washed with distilled water and dried at 30° C.

A synthetic crystalline zeolite material MOR$_1$ with a Si/Al molar ratio of 6.7 was obtained. The Si/Al molar ratio and porosity properties [the specific surface area (S$_{BET}$), the micropore volume (V$_{micro}$), the mesopore volume (V$_{meso}$), and the total pore volume (V$_{total}$)] of the starting crystalline zeolite material MOR and of the prepared synthetic crystalline zeolite material MOR$_1$ are given in Table 3 below.

The specific surface area and porosity properties of the crystalline zeolite materials were obtained by N$_2$ sorption measurements.

TABLE 3

| crystalline zeolite material | Si/Al molar ratio | S$_{BET}$ (m$^2$·g$^{-1}$) | V$_{micro}$ (cm$^3$·g$^{-1}$) | V$_{meso}$ (cm$^3$·g$^{-1}$) | V$_{total}$ (cm$^3$·g$^{-1}$) |
|---|---|---|---|---|---|
| MOR | 6.7 | 379 | 0.17 | 0.06 | 0.23 |
| MOR$_1$ | 6.7 | 441 | 0.19 | 0.09 | 0.28 |

Table 3 clearly shows that the method of the present invention leads to the introduction of a secondary porosity and the increase of the micropore volume, thus involving the increasing of the total pore volume of the starting crystalline zeolite material. The chemical analyses revealed that the Si/Al ratio remains constant.

Figure 13:
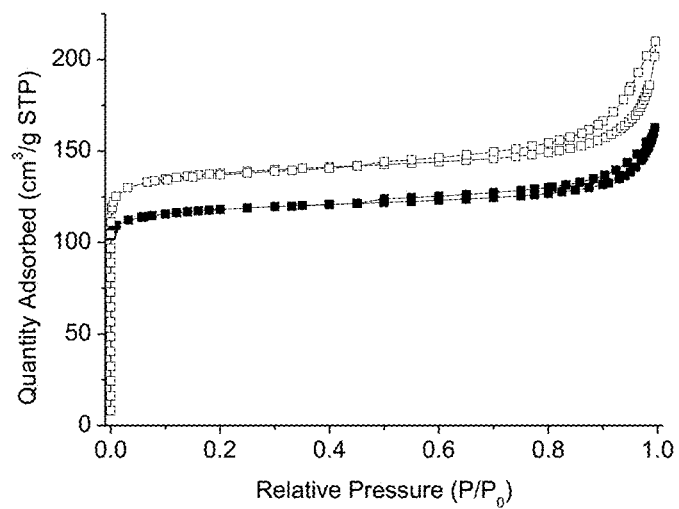
FIG. 13 is a graph of quantity absorbed vs relative pressure of a material from example 5 in accordance with one embodiment.

FIG. 13 represents the nitrogen adsorption/desorption isotherms of the starting crystalline zeolite material MOR (FIG. 13, solid squares) and the synthetic crystalline zeolite material MOR$_1$ (FIG. 13, open squares), and shows the volume adsorbed (in cm$^3$·g$^{-1}$) as a function of the relative pressure P/P$_0$ (in units).

Example 6

Preparation of Synthetic Crystalline Zeolite Materials LTL$_1$ According to the Method of the Invention and Characterization Thereof Step 1):

A NH$_4$F solution was prepared by mixing 8 g of solid NH$_4$F with 32 g of distilled water. The NH$_4$F solution had a mass concentration of 20 wt %. Then, 5 g of starting crystalline zeolite material LTL was immersed into the NH$_4$F solution described above to form a heterogeneous mixture. Then, the heterogeneous mixture was stirred at 35° C. for 60 minutes, and was filtrated to obtain a solid.

Steps 2) and 3):

Then, the obtained solid was thoroughly washed with distilled water and dried at 30° C.

A synthetic crystalline zeolite material LTL$_1$ with a Si/Al molar ratio of 3.3 was obtained.

The Si/Al molar ratio and porosity properties [the specific surface area (S$_{BET}$), the micropore volume (V$_{micro}$), the mesopore volume (V$_{meso}$), and the total pore volume (V$_{total}$)] of the starting crystalline zeolite material LTL and of the prepared synthetic crystalline zeolite material LTL$_1$ are given in Table 4 below:

The specific surface area and porosity properties of the crystalline zeolite materials were obtained by N$_2$ sorption measurements.

TABLE 4

| crystalline zeolite material | Si/Al molar ratio | S$_{BET}$ (m$^2$·g$^{-1}$) | V$_{micro}$ (cm$^3$·g$^{-1}$) | V$_{meso}$ (cm$^3$·g$^{-1}$) | V$_{total}$ (cm$^3$·g$^{-1}$) |
|---|---|---|---|---|---|
| LTL | 3.3 | 338 | 0.15 | 0.04 | 0.19 |
| LTL$_1$ | 3.3 | 431 | 0.17 | 0.08 | 0.25 |

Table 4 clearly shows that the method of the present invention leads to the increase of the total pore volume of the starting crystalline zeolite material. The increase of total pore is namely due to the increase of both the micropore and mesopore volumes. The chemical analyses revealed that the Si/Al ratio remains constant.

Figure 14:
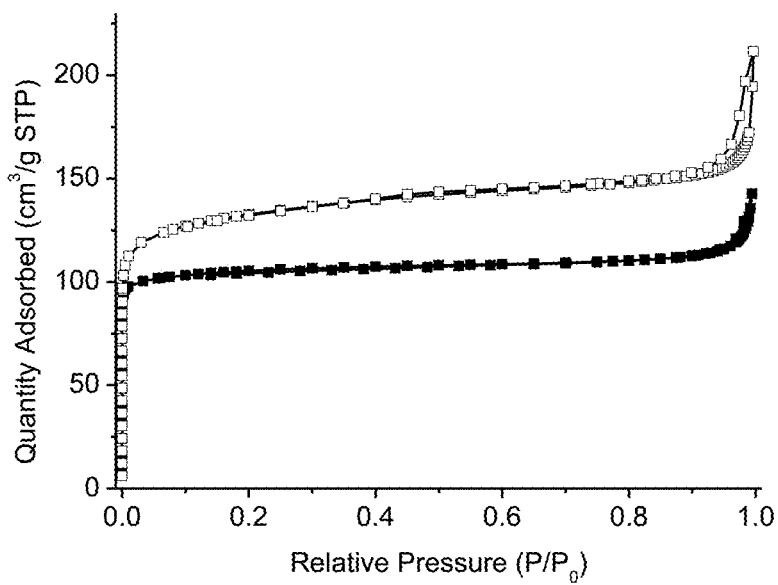
FIG. 14 is a graph of quantity absorbed vs relative pressure of a material from example 6 in accordance with one embodiment.

FIG. 14 represents the nitrogen adsorption/desorption isotherms of the starting crystalline zeolite material LTL (FIG. 14, solid squares) and the synthetic crystalline zeolite material LTL$_1$ (FIG. 14, open squares), and shows the volume adsorbed (in cm$^3$·g$^{-1}$) as a function of the relative pressure P/P$_0$ (in units).

Comparative Example 7

Preparation of Synthetic Crystalline Zeolite Materials Y$_A$ and Y$_B$ which are not Part of the Invention Synthetic zeolites Y$_A$ and Y$_B$ were prepared according the method described in U.S. Pat. No. 5,100,644 and with the conditions used in examples 9 and 10 of U.S. Pat. No. 5,100,644, respectively.

A NH$_4$F solution was prepared by mixing 3.9 g of solid NH$_4$F with 4.96 g of distilled water. The NH$_4$F solution had a mass concentration of 44 wt %. Then, separately, 7.39 g of commercial zeolite Y was mixed with 29.19 g of distilled water to form a zeolite suspension having a zeolite mass concentration of 20.2 wt %.

Then, the NH$_4$F solution was added slowly over a period of 90 minutes at 75° C. on the zeolite suspension, the NH$_4$F solution and the zeolite suspension being maintained at 75° C. during the slow addition. After the addition, the resulting mixture was maintained for a further 3 hours at 75° C.

The solid synthetic zeolite material was separated by filtration, washed with water and dried in air at room temperature.

A synthetic crystalline zeolite material Y$_A$ with a Si/Al molar ratio of 3.5 was obtained. Y$_A$ is not part of the invention since it was not prepared according to the method of the invention.

The same method was repeated with a NH$_4$F solution prepared by mixing 4.95 g of solid NH$_4$F with 4.95 g of distilled water. The NH$_4$F solution had a mass concentration of 50 wt %. Then, separately, 7.39 g of commercial zeolite Y was mixed with 23.4 g of distilled water to form a zeolite suspension having a zeolite mass concentration of 24 wt %.

A synthetic crystalline zeolite material Y$_B$ with a Si/Al molar ratio of 4.2 was obtained. Y$_B$ is not part of the invention since it was not prepared according to the method of the invention.

Figure 15:
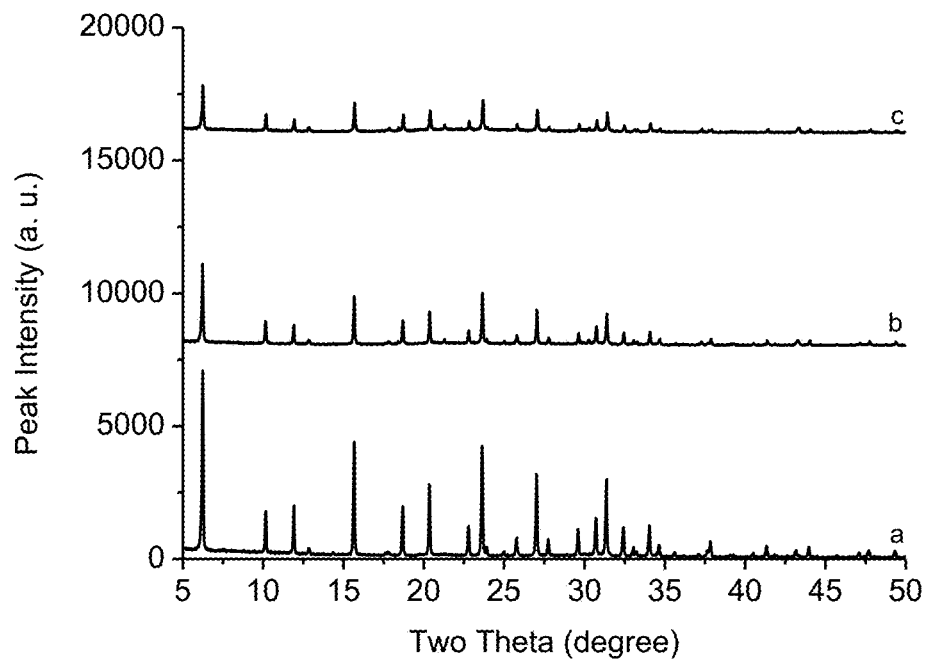
FIG. 15 is a graph of peak intensity vs degree of a material from example 7 in accordance with one embodiment.

FIG. 15 represents the Powder X-ray diffraction (XRD) of the starting crystalline zeolite material Y (FIG. 15$a$), the synthetic crystalline zeolite material Y$_A$ (FIG. 15$b$) and the synthetic crystalline zeolite material Y$_B$ (FIG. 15$c$), and shows the intensity (in arbitrary units, a.u.) as a function of two theta (in degree). FIG. 15 reveals high crystallinity of the starting crystalline zeolite material. However, a substantial loose of crystallinity can be observed for Y$_A$ and Y$_B$ zeolite materials.

Figure 16:
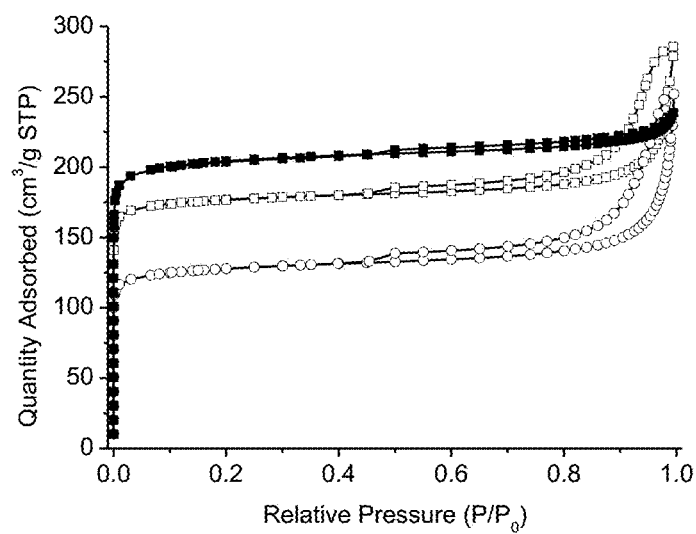
FIG. 16 is a graph of quantity absorbed vs relative pressure of a material from example 7 in accordance with one embodiment.

FIG. 16 represents the nitrogen adsorption/desorption isotherms of the starting crystalline zeolite material Y (FIG. 16, solid squares), the synthetic zeolite material Y$_B$ (FIG. 16, open squares) and the synthetic zeolite material Y$_C$ (FIG. 16, open circles), and shows the volume adsorbed (in cm$^3$·g$^{-1}$) as a function of the relative pressure P/P$_0$ (in units).

Nitrogen adsorption characterizes the porosity of the zeolite materials. According to FIG. 16 and by comparison with FIG. 2, it can be concluded that the prepared synthetic zeolite materials Y$_A$ and Y$_B$ which are not part of the invention, show much lower microporosity level and much larger mesopore size compared with Y$_1$ and Y$_2$ which are part of the invention and prepared in example 1. Such obvious difference in nitrogen adsorption performance reflects the substantial difference in the porosity of zeolites prepared in different ways, and hence reflects the substantial different interaction between zeolite and NH$_4$F solutions in the method of the invention compared to the methods of the prior art.

The Si/Al molar ratio and porosity properties [the specific surface area (S$_{BET}$), the micropore volume (V$_{micro}$), the mesopore volume (V$_{meso}$), and the total pore volume (V$_{total}$)] of the starting crystalline zeolite material Y and of the prepared synthetic crystalline zeolite material Y$_A$ and Y$_B$ are given in Table 5 below:

The specific surface area and porosity properties of the zeolite materials Y$_A$ and Y$_B$ were obtained by N$_2$ sorption measurements.

TABLE 5

| crystalline zeolite material | Si/Al molar ratio | S$_{BET}$ (m$^2$·g$^{-1}$) | V$_{micro}$ (cm$^3$·g$^{-1}$) | V$_{meso}$ (cm$^3$·g$^{-1}$) | V$_{total}$ (cm$^3$·g$^{-1}$) |
|---|---|---|---|---|---|
| Y | 2.6 | 652 | 0.29 | 0.07 | 0.36 |
| Y$_A$ | 3.5 | 563 | 0.26 | 0.17 | 0.43 |
| Y$_B$ | 4.2 | 409 | 0.18 | 0.16 | 0.34 |

The method of the prior art clearly results in a decrease of the micropore volume and in substantial increase of mesopore volume. Thus, the mesopore volume is not increased while maintaining or increasing the starting micropore volume like in the method of the present invention. Indeed, the decrease of the micropore volume results in a deterioration of the adsorption capacity of the zeolite material and in a decrease of its separation capacity.

There is also a substantial decrease of the specific surface area and the Si/Al molar ratio does not remain constant. The decrease of the specific surface area is related with lower crystallinity and induces a decrease of the availability of active sites and thus a dropping of the catalytic activity.

The invention claimed is:

1. A method for the preparation of a synthetic crystalline zeolite material comprising micropores and mesopores, said method either increasing the micropore volume without generating an additional mesoporosity, or creating uniform mesoporosity while maintaining or increasing the microporosity of said synthetic crystalline, said synthetic crystalline zeolite material having a silicon to aluminum molar ratio Si/Al≥1 and, wherein said method comprises at least the following steps:

1$_o$) a step of dissolving a solid NH$_4$F in a solvent creating a NH$_4$F solution, said NH$_4$F solution has a pH of approximately 7;

1) a step of contacting the NH$_4$F solution with a dry starting crystalline zeolite material at a temperature ranging from 0° C. to 100° C., said NH$_4$F solution having a NH$_4$F mass concentration of at least 15 wt % and said starting crystalline zeolite material being a zeolite material in which the micropore volume represents more than 70% of the total pore volume and having a silicon to aluminum molar ratio Si/Al≥1, wherein said step 1) is carried out at a temperature ranging from 0° C. to 60° C.;

2) a washing step;

3) a drying step at a temperature ranging from 25° C. to 120° C., for 1 h to 24 h, to recover said synthetic crystalline zeolite material, wherein the pH of the NH$_4$F solution during the contacting step is approximately 8 or greater, and wherein the Si/Al molar ratio of the dry starting crystalline zeolite material does not vary as a result of said method by more than about 1 from said silicon to aluminum molar ratio Si/Al≥1 of said synthetic crystalline zeolite material.

2. The method according to claim 1, wherein step 1) is carried out for a time ranging from 5 to 180 minutes.

3. The method according to claim 1, wherein the mass ratio of solid $NH_4F$/starting crystalline zeolite material used in step 1) ranges from 0.5 to 25.

4. The method according to claim 1, wherein it further comprises a step of ion exchanging.

5. The method according to claim 1, wherein the $NH_4F$ solution used in step 1) has a $NH_4F$ mass concentration of at least 20 wt %.

6. The method according to claim 1, wherein step 1) is performed by:
   immersing the dry starting crystalline zeolite material in the $NH_4F$ solution to form a heterogeneous mixture, and then by stirring said heterogeneous mixture; or
   pouring the $NH_4F$ solution on the dry starting crystalline zeolite material so as to saturate its micropore volume, and then by filtrating it so as to remove the excess of $NH_4F$ solution and to form an impregnated solid.

7. The method according to claim 1, wherein it further comprises a step of functionalizing said synthetic crystalline zeolite material with at least one active compound.

8. The method as defined in claim 1, wherein said method introduces micropores having a mean dimension of more than 1 nm and/or mesopores having a mean dimension of 2 to 25 nm while maintaining or increasing the micropore volume, in a crystalline zeolite material which is essentially microporous.

9. The method as claimed in claim 1, wherein the Si/Al molar ratio of the dry starting crystalline zeolite material does not vary as a result of said method by more than about 0.1 from said silicon to aluminum molar ratio Si/Al≥1 of said synthetic crystalline zeolite material.

* * * * *